(12) United States Patent
Nwabueze et al.

(10) Patent No.: US 6,775,675 B1
(45) Date of Patent: Aug. 10, 2004

(54) METHODS FOR ABSTRACTING DATA FROM VARIOUS DATA STRUCTURES AND MANAGING THE PRESENTATION OF THE DATA

(75) Inventors: E. Kenneth Nwabueze, Porter Ranch, CA (US); Siva Venkataraman, Lakeview Terrace, CA (US); Supratim Roy Chaudhury, Glendale, CA (US); Appan Thirumaligai, Glendale, CA (US)

(73) Assignee: SageMetrics Corporation, North Hollywood, CA (US)

( * ) Notice: Subject to any disclaimer, the term of this patent is extended or adjusted under 35 U.S.C. 154(b) by 331 days.

(21) Appl. No.: 09/826,618

(22) Filed: Apr. 4, 2001

(51) Int. Cl.[7] .............................................. G06F 17/30
(52) U.S. Cl. ...................................................... 707/100
(58) Field of Search ........................ 707/1, 102, 103 R, 707/100

(56) References Cited

U.S. PATENT DOCUMENTS

| | | | | |
|---|---|---|---|---|
| 6,456,997 B1 | * | 9/2002 | Shukla | ........................... 707/1 |
| 6,473,764 B1 | * | 10/2002 | Petculescu et al. | .......... 707/102 |
| 6,477,536 B1 | * | 11/2002 | Pasumansky et al. | ........ 707/102 |
| 6,549,906 B1 | * | 4/2003 | Austin et al. | .................. 707/10 |
| 6,594,672 B1 | * | 7/2003 | Lampson et al. | ........ 707/103 R |

\* cited by examiner

*Primary Examiner*—Safet Metjahic
*Assistant Examiner*—Haythim J. Alaubaidi
(74) *Attorney, Agent, or Firm*—Martine & Penilla, LLP (57) ABSTRACT

Methods for accessing relevant data from data sources for presentation, and computer readable media for the same are provided. One exemplary method defines multiple dimensions. Then data sources are identified that contain relevant information for the dimensions. Next the data sources are accessed through an abstraction layer. The abstraction layer performs the operations of transferring portions of the relevant information to a data structure and displaying the selected portions of the relevant information. Some notable advantages of the discussed methods include the ability to create virtual dimensions by building a hierarchical table structure from data in a flat file. The use of an abstraction layer allows for ease of modification and efficiency in presentation, since only the user requested data is presented. In addition, the customer is provided dynamic reports in real-time, thereby allowing for time sensitive and mission critical business decisions to be made with current data.

18 Claims, 9 Drawing Sheets

| Channel ▼ | | | | | | | |
|---|---|---|---|---|---|---|---|
| visit year ▼ | Country ▼ | visit day ▼ | visit week ▼ | visit month ▼ | Pageviews | Entrances | Exits | Singles |
| ⊒2000 | ⊒USA | ⊒13 | ⊒3 | 7 | 2,836 | 606 | 1,275 | 336 |
| | | | | Total | 2,836 | 606 | 1,275 | 336 |
| | | | Total | | 2,836 | 606 | 1,275 | 336 |
| | | ⊒14 | ⊒13 | 7 | 7,752 | 973 | 1,884 | 268 |
| | | | | Total | 7,752 | 973 | 1,884 | 268 |
| | | | Total | | 7,752 | 973 | 1,884 | 268 |
| | | ⊒15 | ⊒13 | 7 | 1,019 | 234 | 491 | 114 |
| | | | | Total | 1,019 | 234 | 491 | 114 |
| | | | Total | | 1,019 | 234 | 491 | 114 |
| | | Total | | | 11,607 | 1,813 | 3,650 | 818 |
| | Total | | | | 11,607 | 1,813 | 3,650 | 818 |
| Total | | | | 3 | 11,607 | 1,813 | 3,650 | 818 |

Fig. 8C

| Country ▼ | Channel ▼ | visit year ▼ | visit month ▼ | visit week ▼ | visit day ▼ | Pageviews | Entrances | Exits | Singles |
|---|---|---|---|---|---|---|---|---|---|
| +⌐ Argentina | | | | | | 12,361,272 | 1,045,106 | 2,420,735 | 8,014 |
| +⌐ Brazil | | | | | | 8,254,579 | 296,445 | 475,387 | 0 |
| +⌐ Chile | | | | | | 2,799,423 | 460,638 | 566,343 | 355 |
| +⌐ Columbia | | | | | | 887,634 | 85,206 | 275,241 | 141 |
| +⌐ Mexico | | | | | | 12,858,591 | 983,423 | 2,753,662 | 2,244 |
| +⌐ USA | | | | | | 721,275 | 173,544 | 264,688 | 132 |
| ⊒ Uruguay | ⊒ HomePage | ⊒ 2000 | ⊒ 08 August | ⊒ 3 | 13 | 41,277 | 3,674 | 13,313 | 0 |

METHODS FOR ABSTRACTING DATA FROM VARIOUS DATA STRUCTURES AND MANAGING THE PRESENTATION OF THE DATA

CROSS REFERENCE TO RELATED APPLICATIONS

This application is related to U.S. patent application Ser. No. 09/826,740 filed on the same day as the instant application and entitled "COMPUTER IMPLEMENTED METHODS FOR DYNAMICALLY ORGANIZING AND PRESENTING DATA IN A MULTI-DIMENSIONAL FORMAT." This application is hereby incorporated by reference.

BACKGROUND OF THE INVENTION

1. Field of the Invention

This invention relates generally to data analysis and presentation and more particularly to a system and method for analyzing, aggregating and presenting an unlimited amount of data as customizable and easily modified reports, generally used for business intelligence purposes.

2. Description of the Related Art

Vast amounts of data are available for corporations concerning their customers. A business has numerous contact points with customers including but not limited to the Internet, Interactive Voice Response (IVR) systems, private company databases, and Enterprise Resource Planning (ERP) systems. Each of these customer contact points contains data capable of being mined and presented for business intelligence purposes.

The Internet has allowed unlimited access for customers to a company's web site. This unlimited access creates a wealth of information in the form of web log files. Companies can use the web log files to extract information concerning the customers use of the web site.

An organization may have a phone system capable of Interactive Voice Response that customers routinely access. Data stored in the IVR data files can be presented to provide a profile of a customer's use of the IVR system. In addition, private company databases also contain data files that can be mined and presented for business intelligence purposes.

Typically a business will have in-house databases containing accounting, financial and sales data. These in-house databases are commonly referred to as ERP systems and are a valuable source of financial data.

It can be appreciated that there are a large number of sources containing data that can be aggregated by businesses to analyze customer interactions. The data contained in each of the above referenced databases consists of various data file types (i.e., varying data format). Even within the same database the file types may differ. Under current practices, the presentation of multi-dimensional data (e.g., cubes) from the various data files yields rigid reports incapable of being easily modified.

With the wealth of data available, it is necessary to create meaningful reports that integrate and parse the data in a manner that will reveal a coveted relationship. Because of the overwhelming amount of data available, it is necessary to manipulate the data so that the presentation of the data will capture the essence of a previously unknown relationship. Accordingly, the customer will need the capability to modify an interactive presentation so that the data is viewed from all angles in real-time.

Presentation of the data can take the form of a two dimensional report (e.g., using spreadsheets or tables) or a multi-dimensional report (e.g., using cubes). In a multi-dimensional presentation, a cube may be displayed. Under current practices, the cube is displayed from a defined data set through an online analytical processing (OLAP) system. An OLAP data cube can be presented as a multi-dimensional cube representing any number of descriptive categories or business metrics (dimensions) and quantitative values (measures). An example of a dimension could be a time dimension such as the number of visits to a sports web site in a day, week month or year time frame, while a measure could be the number of times a Uniform Resource Locator (URL) has been viewed (page-views), the number of times a URL has been used as an entry page (entrance) or the number of times a URL has been used as an exit page (exit). A dimension may further be defined as a sub-dimension or level. For example, a sports web site may be subdivided into a particular sport such as football or baseball.

Current OLAP systems demand that once the customer defines the dimensions of the cube, the required data be input into a relational data table, in a uniform format, as defined by a particular OLAP system. The building of the relational data table is a time consuming and expensive process. Furthermore, once the data table has been built the customer is limited to the dimensions defined above. In other words, once the dimensions are defined by the customer and the relational data tables are built, the dimensions are fixed. In order to add a dimension once the relational data table is built, the manager of the relational data table would need to modify its data structure. Such a modification is a monumental task, which is virtually impossible, as well as time consuming and prohibitively expensive. For example, to add a dimension where data from the previous year or two for a web site with high traffic would require a massive effort where literally billions of data would be required to be obtained, formatted and loaded.

Figure 1:
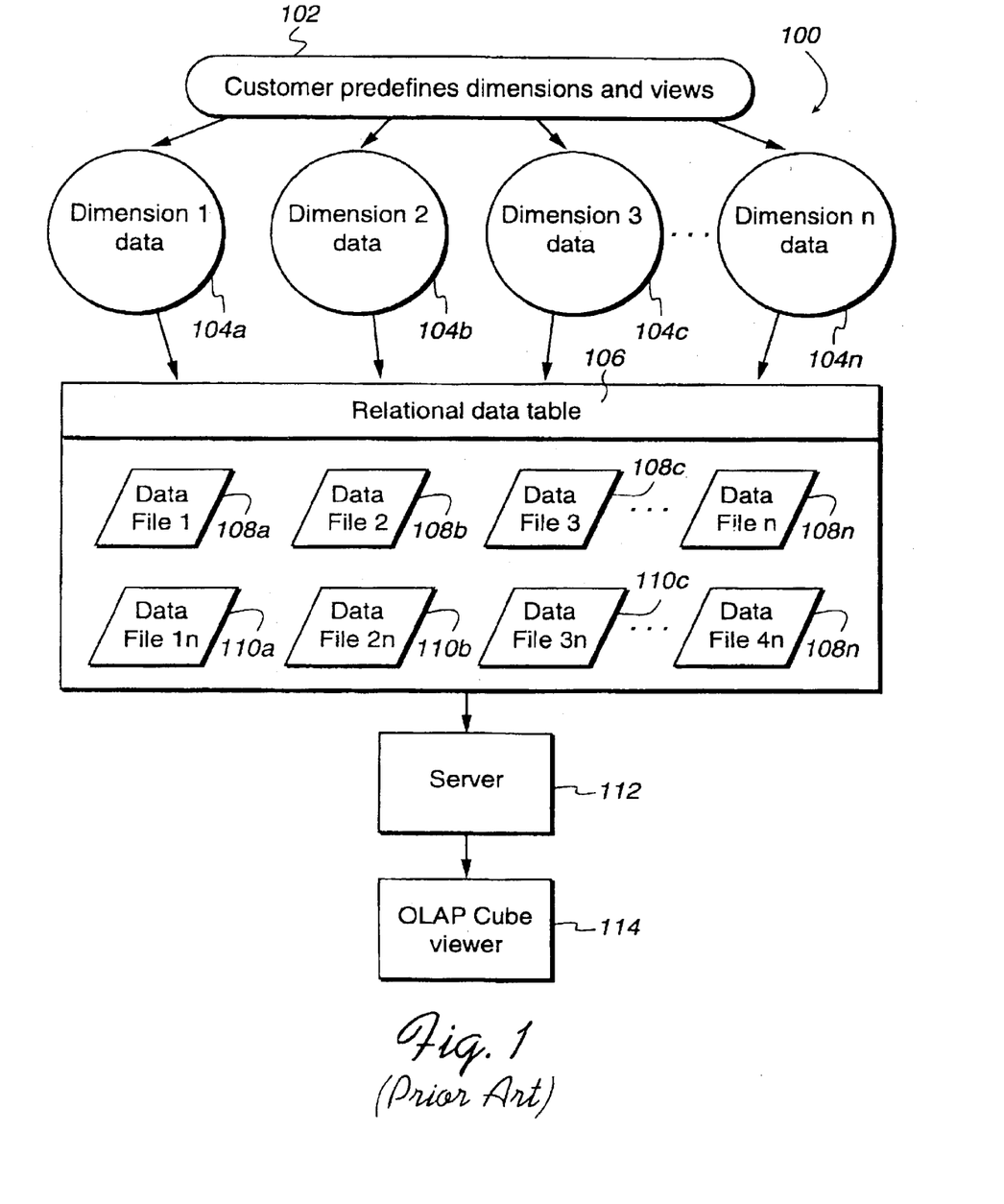
FIG. 1 illustrates an exemplary prior art method summarizing the current practice employed by the industry to present multi-dimensional displays.

FIG. 1 illustrates a block diagram 100 summarizing the current practice employed by the industry. In FIG. 1, the example may be considered as that of a newspaper's web site where the newspaper is interested in viewing the web site traffic through its various web pages. First, the customer (the newspaper organization) predefines the dimensions and views 102 that are to be measured and presented. Next, the data relevant to each dimension, depicted as 104a, 104b, 104c and 104n are input to a relational data table 106. It can be appreciated that the dimensions can include any business metric capable of being captured and input into the relational data table 106. For example, the dimensions may include the traffic data from various sections of a newspaper's web site such as sports, politics, real estate and financial sections and the data from these respective sections may be represented by 104a, 104b, 104c and 104n, respectively. The data for each dimension are converted to a uniform format and input into the relational data table 106 as data files DF1 108a, DF2 108b, DF3 108c and DFn 108n. As shown in FIG. 1, any number of data files can be input into the relational data table 106 as represented by data files DF1 110a, DF2 110b, DF3n 110c and Dfnn 110n. A server 112 then aggregates the data and optimizes the storage of the data so that the data may be viewed according to the users predefined request 102. An OLAP cube viewer 114 then takes the data from the server 112 and presents the cube as predefined by the user in operation 102. It should be noted that the cube viewer 114 can be any of a number of commercially available cube viewers (e.g., cube viewers from MICROSOFT™, HYPERION™ or CUBULARITY™).

As noted above, the current method of viewing a multi-dimensional OLAP cube requires that the data structure, i.e., relational data table, exists prior to the cube viewer looking at the table. Because the relational data table must be predefined, the dimensions of the cube are fixed up-front since each dimension of the cube must be defined in a field of the relational data table. In addition, the data must be in a specified format for the cube viewer to recognize the data. Moreover, all the data predefined by the customer, is downloaded locally to the customer's computer or the entire cube must be viewed on a server through the Internet, even if the viewer only desires to view a subset of the data. As such, viewing of the cube may become a slow process as the cube size increases.

In a dynamic and fast paced business environment where change is constant, the rigidity and inflexibility of the current method of processing and viewing OLAP cubes fails to unleash the true potential of an OLAP system. Consumer buying habits or Internet viewing patterns can change in an instant by numerous external variables (i.e., fads, safety concerns, protests or boycotts). If a customer did not have the foresight to include a dimension capturing the data to monitor a change in the buying habits or viewing patterns, the data contained in the relational data table is rendered useless by the change in an external variable. If a customer wishes to modify or add a dimension, a new relational data table must be created assuming the data for the modified or new dimension is even available. Since the creation of the table is time consuming, the data the customer desires to capture may be stale by the time the process is repeated. Additionally, the cost may be prohibitive.

Much of the aforementioned problems with the OLAP cube presentation arise because of the present system's requirement of predefining all dimensions up-front combined with the lack of any simple and inexpensive method to change the dimensions and gather the necessary data for the change. Moreover, report updates require the entire process to be repeated, thereby incurring a high cost, losing valuable time and not allowing for the generation of true on-demand reports.

As a result, there is a need for a solution to the problems of the prior art to allow each customer the capability to easily modify the dimensions, create virtual dimensions and to seamlessly integrate web based and non-web based data. There is also a need for methods that enable a user to view only the data which is requested for better efficiency.

SUMMARY OF THE INVENTION

Broadly speaking, the present invention fills these needs by providing a flexible dynamic and efficient method for acquiring and presenting data from various sources to be used for business intelligence purposes. It should be appreciated that the present invention can be implemented in numerous ways, including as a process, an apparatus, a system, computer readable media, or a device. Several inventive embodiments of the present invention are described below.

In one embodiment, a method accessing selected data for presentation as multi-dimensional cubes over a network connection is provided. In this embodiment dimensions for generating a cube are defined. Next processed data from a flat file are acquired where the processed data contain relevant information for the defined dimensions. Then the acquired processed data is stored in a hierarchical table structure. Then a cube is generated from the hierarchical table structure. Next the cube is accessed through an abstraction layer. The abstraction layer performs the operations of reading only selected portions of the relevant information for the defined dimensions, converting the selected portions of the relevant information to a uniform format and displaying selected portions of the relevant information without causing non-selected portions of the relevant information to be read and converted.

In another embodiment a method for accessing selected data for presentation as multi-dimensional cubes over a network connection is provided. In this embodiment a first and a second dimension for generating a cube are defined. Then a hierarchical table structure is created from a flat file for the first dimension where the hierarchical table structure contains relevant information to the first dimension. Then a cube is generated from the hierarchical table structure. Next a relational data table is identified for the second dimension where the relational data table contains relevant information to the second dimension. Then the cube and the relational data table are accessed through an abstraction layer. The abstraction layer performs the operations of reading only selected portions of the relevant information for the defined dimensions, converting the selected portions of the relevant information to a uniform format and displaying selected portions of the relevant information without causing non-selected portions of the relevant information to be read and converted.

In yet another embodiment, a method for accessing relevant data from differing sources for presentation over a network connection is provided. In this embodiment multiple dimensions are defined. Then data sources for the multiple dimensions are identified where the data sources contain relevant information for the dimensions. Next the data sources are accessed through an abstraction layer. The abstraction layer performs the operations of transferring selected portions of the relevant information for each dimension from each data source to a data structure and displaying the selected portions of the relevant information.

In still another embodiment, a computer readable media having program instructions for accessing relevant data from differing data sources for presentation over a network connection is provided. One exemplary computer readable media includes program instructions for defining multiple dimensions. In addition, the computer readable media includes program instructions for identifying data sources for the multiple dimensions where the data sources contain relevant information for the dimensions. Additionally, the computer readable media includes program instructions for accessing the data sources through an abstraction layer, where the abstraction layer includes program instructions for transferring selected portions of the relevant information for each dimension from each data source to a data structure, and program instructions for displaying the selected portions of the relevant information.

The advantages of the present invention are numerous. Most notably, the methods for displaying multi-dimensional views to allow the customer to create virtual dimensions that can easily be modified. The creation of the virtual dimensions through the building of a hierarchical table structure from data contained in a flat file allows the customer to be provided with ad-hoc dynamic reports in real-time (e.g., in web database formats), thereby allowing for time sensitive and mission critical business decision to be made with all the current data at the executives fingertips. In addition, the use of an abstraction layer to manage the data being presented allows for ease of modification and efficiency in presentation since only the user requested data is presented. Furthermore, due to the uniform centralized format of the acquired data, the presentation of the data can be modified and represented in an efficient manner. Finally, the presentation of the data can be customized to present a multi-dimensional display of the real world raw data enabling the customer a 360° view of what is happening with an organization.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for computer implemented methods for analyzing, aggregating and presenting an unlimited amount of data as customizable and easily modified reports. It will be obvious, however, to one skilled in the art, that the present invention may be practiced without some or all of these specific details. In other instances, well known process operations have not been described in detail in order not to unnecessarily obscure the present invention.

In order to solve the problems of the prior art, the embodiments of the present invention provide computer-implemented methods that intelligently automate the extraction, organization, formatting and presentation of data from various data sources. Through the disclosed embodiments, on-line and off-line transaction data of varying data formats are capable of being integrated to provide multi-dimensional displays (e.g., OLAP cube) yielding a complete picture of a customer's business data. As used herein, a customer may be a company or organization that may need to capture information regarding its business units, its clients, its web site use, its in-house operations, and related business transactions. In one embodiment, the features of the present invention may be incorporated into a globally networked service. An example is one that uses the Internet. A customer desiring such a service can therefore sign-up and subscribe over the network, and then commence usage of the services to perform the desired data analysis and presentations. It should be noted that the computer-implemented methods would therefore be executed on one or more computers and associated storage systems that are linked to the global network, such as the Internet. Of course, the network can also be in the form of a local area network, a wide area network, or even from a standalone computer having access to desired data sources.

In one embodiment, data from an in-house enterprise resource planning (ERP) system for a customer can be combined with data concerning a third party's use of the customer's web site and Interactive Voice Response (IVR) phone system to provide valuable information concerning the third party's buying practices and information needs (e.g., such as which web pages were most visited).

The above mentioned data is also valuable for a client's internal decision making. For example, the information gathered and presented by the methods of the present invention will assist a client in assessing the success of a sales/marketing campaign or which combinations of goods or services are popular with customers. More importantly this data, in one embodiment, is presented in an online analytical processing (OLAP) cube, where an unlimited number of dimensions can be included, added or modified at any time. The dimensions are therefore virtual dimensions that can be dynamically defined from any type of data. As such, the customer is freed from the restrictive practice of limiting the presentation of the data to only those presentations including the predefined dimensions. In addition, the data being assessed can be continually updated and presented in an incremental fashion. For example, sales data can be used to maintain a business' inventory and plan manufacturing campaigns to avoid any backorder situations. The dynamic reports of one embodiment of the present invention allow a business to continually monitor its operations in order to more efficiently manage its resources. It can be appreciated that numerous sales, marketing, financial and operations data can be analyzed and used for business intelligence purposes.

Presentation of the data can be two dimensional (e.g., using spreadsheets or tables) or multi-dimensional (e.g., using cubes). In one embodiment of the invention a cube can be presented as summaries of a defined data set through an OLAP system. An OLAP data cube can be presented as a multi-dimensional cube representing any number of descriptive categories or business metrics (dimensions) and quantitative values (measures). Through the cube presentation, a customer can create multi-dimensional views of one-dimensional data.

Examples of a dimension include time dimensions, such as the number of visits to a web site in a day, week month or year time frame, a Uniform Resource Locator (URL) specifying a web page, and sales information such as the sales of a product or product line. A measure may include the number of times a URL has been viewed (page-views), the number of times a URL has been used as an entry page (entrance) and the number of times a URL has been used as an exit page (exit). A multi-dimensional cube can be presented using the above mentioned dimensions and measures in order to view the data from different points of view and possibly discover previously undetected relationships between the data items. OLAP software can locate the intersection of dimensions and display them. For example, a company such as the www.samplecompany.com may learn that of all the visitors to its web site over the previous quarter (dimension) 80% of the visitors initially open the politics page (measure) and then 70% of the same visitors move to the sports page (measure). This data can be used to make business decisions such as what type of ads top place on the web site, where to locate the ads and how to make navigation of the web site easier for the most frequent users. It should be appreciated that an OLAP data cube can be constructed through any number of dimensions and measures.

Figure 2:
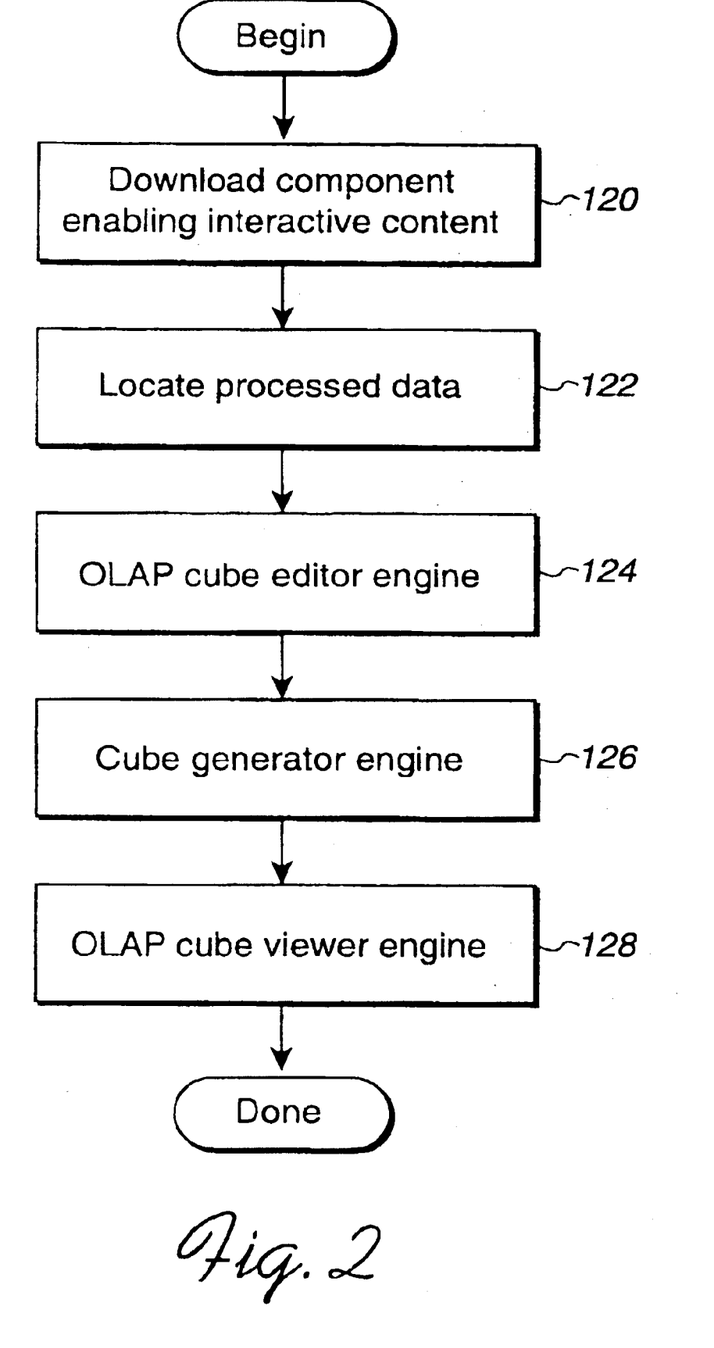
FIG. 2 shows a flowchart defining an overview of a method for analyzing, aggregating and presenting an unlimited amount of data as customizable and easily modified reports in accordance with one embodiment of the present invention.

FIG. 2 shows a flowchart 118 defining an overview of a method for analyzing, aggregating and presenting an unlimited amount of data as customizable and easily modified reports in accordance with one embodiment of the present invention. It should be understood that the method depicted in flowchart 118 may be in a program instruction form written and stored on any type of computer readable media. For instance, the program instructions can be in the form of software code developed using any suitable type of programming language. For completeness, the method of FIG. 2 will illustrate an exemplary process whereby a multi-dimensional report may be generated and displayed. It should be noted that the method of FIG. 2 is a high level overview of the method and will be explained in more detail in reference to later figures.

In initial operation 120, a component enabling interactive content is downloaded. For example, the component can be ACTIVEX™ control for enabling interactive content on the Internet. It can be appreciated that the component enabling interactive content can be any of a number of commercially available strategic object oriented programming technologies and tools capable of being downloaded over the Internet such as java applets. Next, operation 122 is executed where a processed data file is located. In one embodiment of the invention, the processed data file may be stored in a flat file. In another embodiment of the invention the processed data file may be stored in a web database. A processed data file may be referred to as post stage load data, processed display data or processed data. For more information on acquiring raw data from various data sources and transforming the data to processed data of a uniform format, reference may be made to U.S. patent application Ser. No. 09/810,676 entitled "Methods For Dynamically Accessing, Processing, and Presenting Data Acquired from Disparate Data Sources," and filed on Mar. 15, 2001. This application is hereby incorporated by reference.

Continuing with the high level discussion, the method proceeds to operation 124 where an OLAP cube editor engine defines the cube. Here, the dimensions the customer desires to see displayed are entered to define virtual dimensions. It should be understood that the customer is not restricted in modifying or adding a dimension as in the prior art. The customer may modify or add a new dimension even though the customer has previously defined different dimensions. The customer is free to add any dimension so long as a processed data file containing relevant information to the dimension can be obtained. Additionally, values (i.e., sub-dimensions and levels) are created and defined for the cube. It is understood that cube editor engine 124 may utilize a menu driven user interface which follows an interview format. For example, a wizard similar to those used in the set-up of popular desktop software programs may be employed. In one embodiment, a wizard referred to as "CUBE BUILDER™" can be used by the customer to modify or create an OLAP cube.

After operation 124, the method then advances to operation 126 where a cube generator engine gathers processed data containing relevant information to the dimensions defined by the customer. In one embodiment of the invention the processed data is stored in a flat file. The processed data is parsed (thus marking the data) to identify the relevant information for each defined dimension. The cube generator engine 126 then creates a hierarchical table structure which is a virtual tree structure of the selected dimensions, and then transfers the parsed data for each dimension defined by the customer to the hierarchical table structure. The cube generator engine 126 allows for any modifications or additions to dimensions requested in operation 124 to be efficiently processed since the cube generator engine 126 creates virtual dimensions based on any information contained in the flat file, including transactional and non-transactional data.

The method terminates with operation 128 where an OLAP cube viewer engine lists available cubes and displays each of the cubes contents. It can be appreciated that the mechanism of presentation of the reports to the customer can occur through a number of readily available modes, such as logging on to a web browser enabled computer or device (whether connected to a network or by a wireless link), electronic messaging (e.g., electronic mail), and the like.

Figure 3:
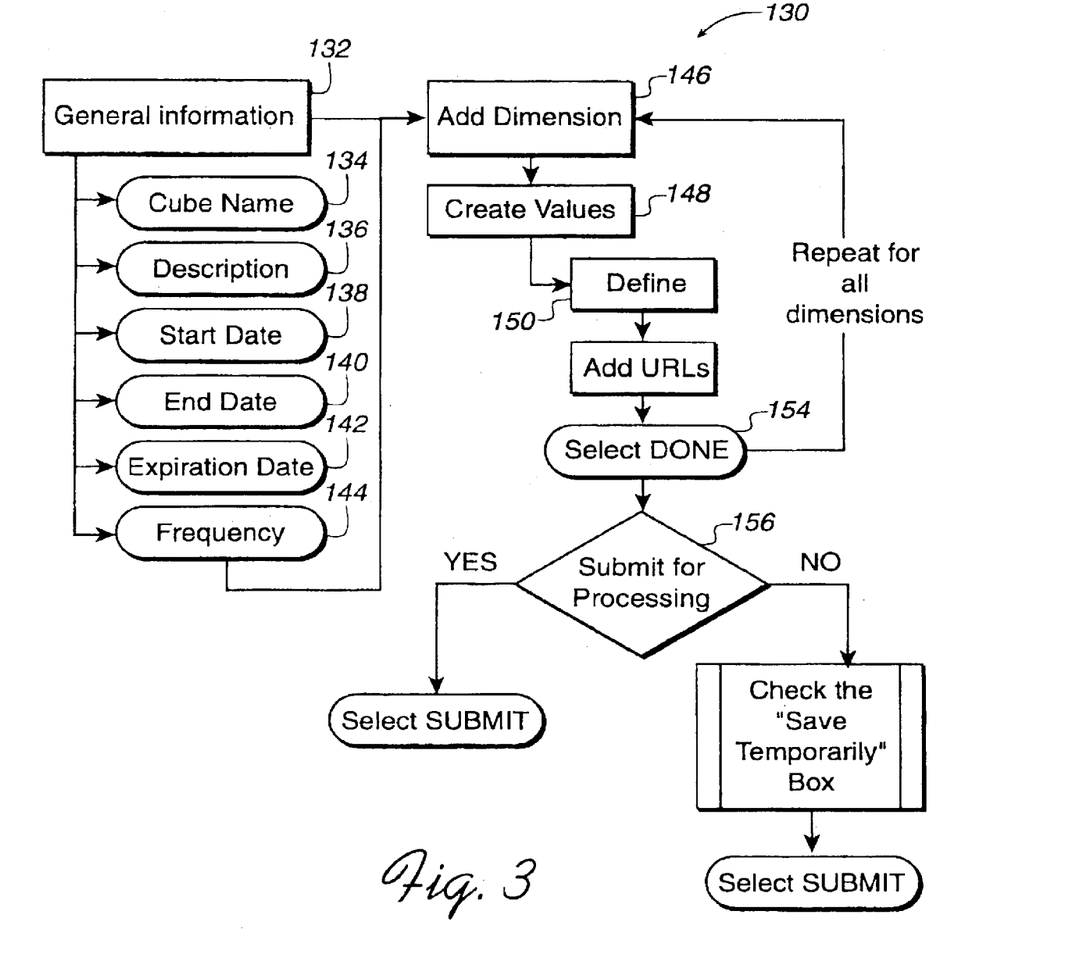
FIG. 3 illustrates a block diagram defining the functions performed by the cube editor engine in accordance with one embodiment of the present invention.

With the overview in mind, FIG. 3 illustrates a block diagram 130 defining the functions performed by the cube editor engine in accordance with one embodiment of the present invention. Block diagram 130 initiates with operation 132 where general information is input by the customer. The general information may include a description of the cube and temporal information covering the periods of interest for viewing the data. For example the general information may include a cube name 134 identifying the cube, a description of the cube 136, a start date 138 defining a starting point for gathering the data for the cube, an end date 140 defining an ending point for data gathering, an expiration date 142 defining when the cube will expire and a frequency 144 defining how often the cube is updated with new information. It should be understood that the start date can be any date (i.e., past present or future) as long as there is retrievable data available. The end date can also be any date after the start date. In a preferred embodiment of the invention, the frequency of updating the cube is either daily, weekly or monthly. It should be further understood that the general information 132 may be entered with the aid of a number of commonly used interactive tools such as drop down lists, drop down calendars or wizards using an interview format.

Upon completion of entering the general information 132, the customer proceeds to add the dimensions 146. Here, the customer defines the dimensions they wish to have displayed. A dimension is an attribute of a cube that may have multiple hierarchies of different levels. The user may create values (also referred to as levels or sub-dimensions) for the dimensions and then define those values by providing patterns to match against existing data. For example, a dimension may be created for a web page sports section called Sports. Values or levels of the Sports dimension may then be created in 148 such as soccer and basketball. These values or levels would then be defined in 150 with patterns to match against existing data. The patterns in the data to define soccer could then be */soccer/* and */WorldCup/* and the patterns in the data to define basketball could then be */basketball/*, */NBA/*, etc.

The value may be defined in a manner such that any URL of the customer's web site containing relevant information may be captured. It is understood that this can be accomplished through the use of wildcards or delimiters when defining the values. It can be appreciated that a web log file will contain relevant information pertaining to the URL. In one embodiment of the present invention, the processed data in the flat file may be accessed by a cube generator engine to be used to create a hierarchical table structure. It should be further appreciated that while the example provided above used a web site and Internet traffic, non-web based data may be included as a dimension also. Sales and financial data from an Enterprise Resource Planning (ERP) system provide a number of business metrics capable of serving as dimensions as described above. In addition, a dimension can be any information that can be stored in a database which includes wireless and streaming media data.

After defining the value, the process is repeated for any additional dimensions 154. Once all the dimensions, values and definitions have been entered, the data is submitted for processing 156. Here, the cube generator engine parses, marks and generates a table for each dimension as will be described in more detail in reference to FIG. 4 below. In one embodiment of the present invention, the customer may be given the option to temporarily save the information being entered for all the dimensions in order to continue the work at a later time. Once all the information is entered, the customer can then choose to submit the data for processing. It can be appreciated that the option to temporarily save the information can be presented as a query to the customer prior submitting the data for processing. In addition, the customer can be presented a check box window presenting the customer with the choice of temporarily saving the information by checking the box.

Figure 4:
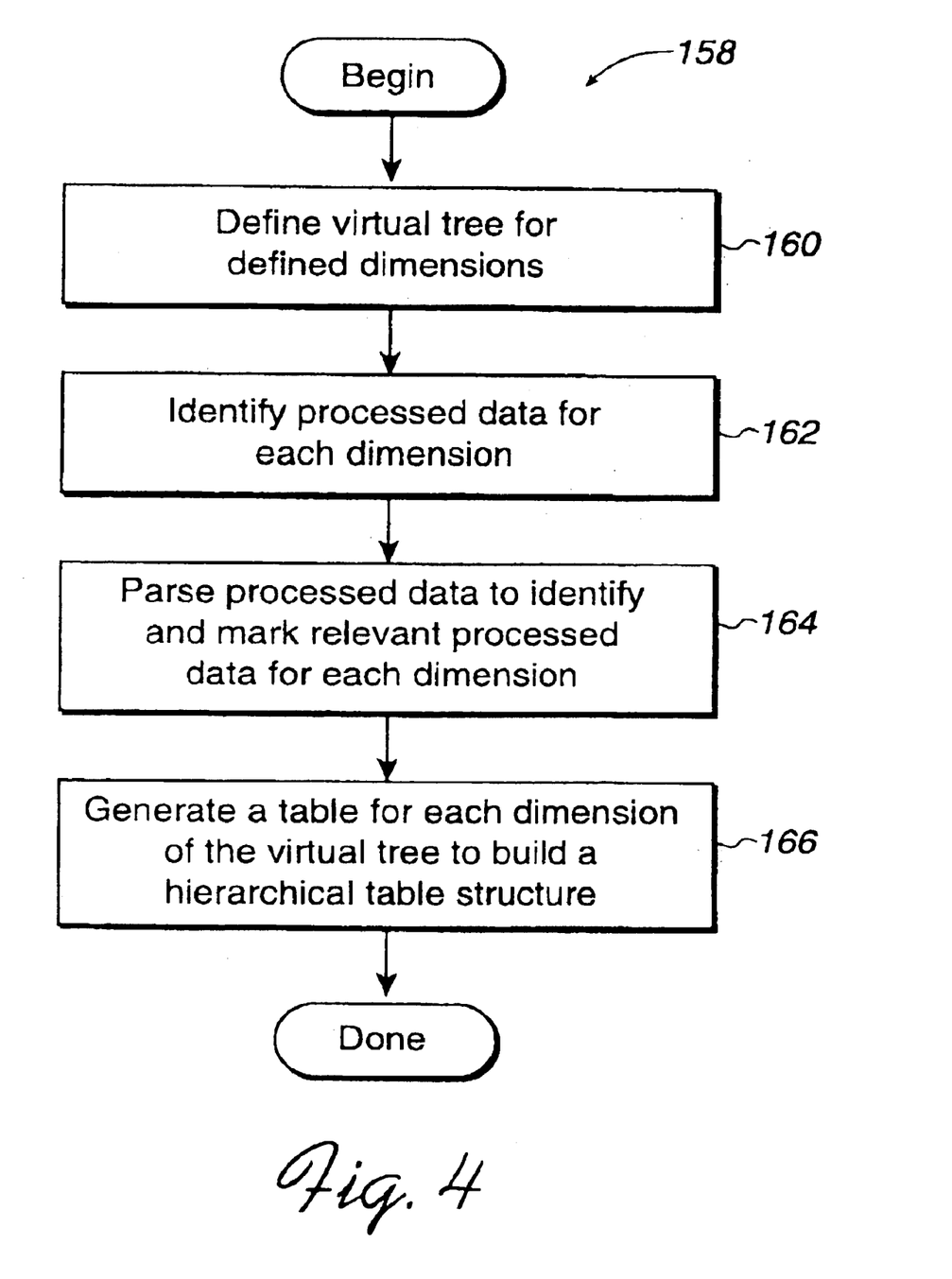
FIG. 4 displays a flowchart defining a more detailed description of a cube generator engine in accordance with one embodiment of the invention.

FIG. 4 displays a flowchart 158 defining a more detailed description of a cube generator engine in accordance with one embodiment of the invention. Flowchart 158 initiates with operation 160 where a virtual tree is defined. Here the virtual tree is defined by the dimensions designated by the customer. Within the virtual tree, the hierarchy of each dimension and its associated values and definitions is identified. In one embodiment of the invention the processed data may be stored in a flat file. The processed data file contains information that is relevant to the customer's defined dimensions. It is understood that the processed data file may contain Internet related data, such as web site traffic, financial and accounting data, such as sales data or any business metric useful for business analysis. Next the method advances to operation 162, where the processed data is identified. In one embodiment of the invention, the processed data may be stored in flat file data compartments in a uniform format.

Continuing with flowchart 158, the identified data from operation 162 is parsed and marked in operation 164 to identify the relevant information. The parsing and marking of the relevant data for the defined dimensions identifies the relevant data in the processed data file so that the relevant data may be extracted and transferred to a hierarchical table structure. In one embodiment of the invention the parsing and marking is performed for one dimension at a time for each level of the dimension.

Flowchart 158 terminates with operation 166, where a table for each dimension of the virtual tree is generated to build a hierarchical table structure. Here, the relevant data identified in operation 164 is used to build a table for each defined dimension. The combination of tables for each dimension represents a tree structure. It may be appreciated that the virtual tree defined in operation 160 now contains the relevant data in a format capable of being viewed by a cube viewer. It can be appreciated that the method described in flowchart 158 creates virtual dimensions based on transactional as well as non-transactional data.

Figure 5:
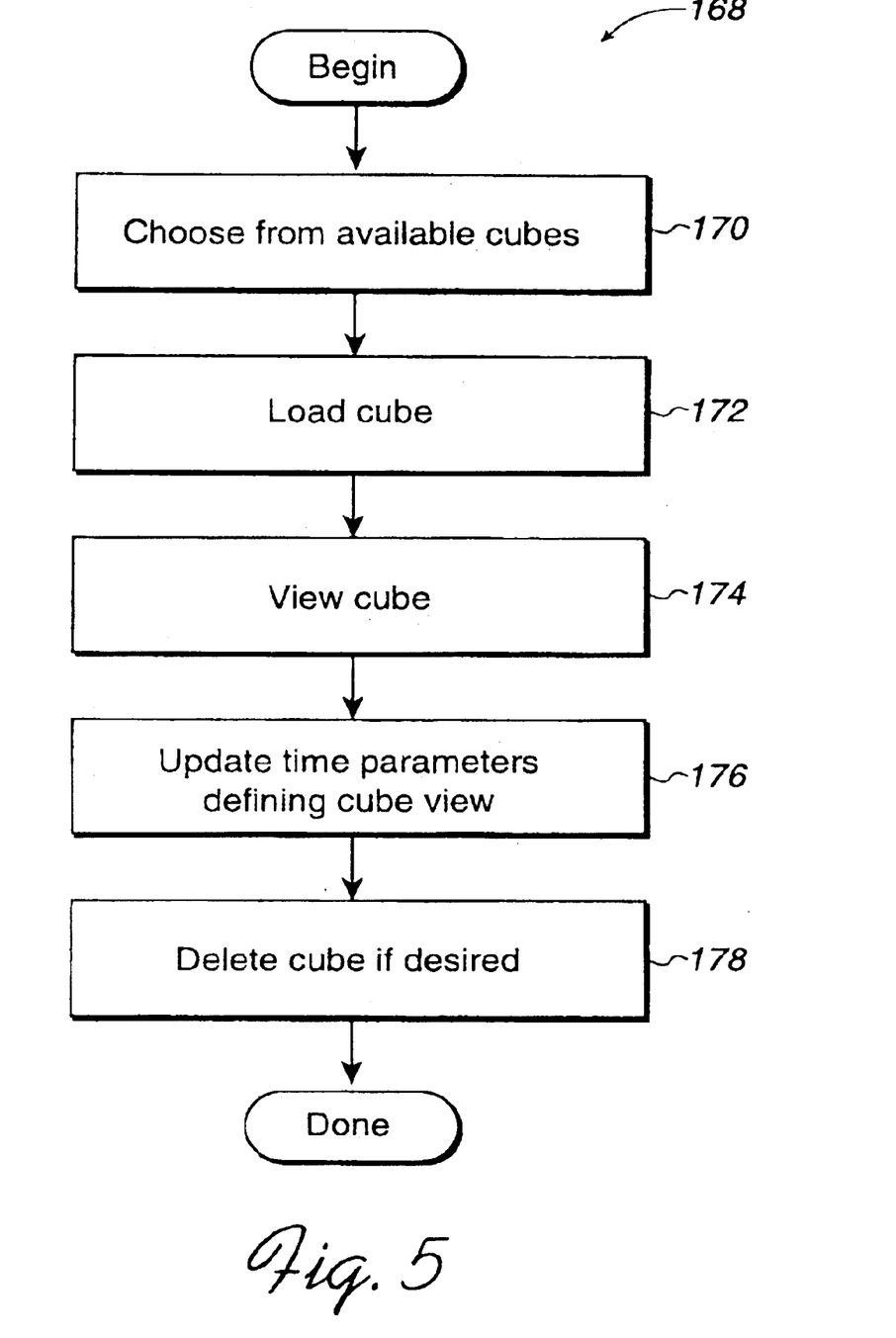
FIG. 5 displays a flowchart defining a more detailed description of an OLAP cube viewer engine in accordance with one embodiment of the invention.

FIG. 5 displays a flowchart 168 defining a more detailed description of an OLAP cube viewer engine in accordance with one embodiment of the invention. Flowchart 168 initiates with operation 170, allowing the customer to choose from available cubes. Here, the customer may choose from previously created cubes and may decide to view an updated version of the cube. For example, the customer may desire to view an update from the previous time point in which the cube was viewed. This may include viewing the latest data from the defined dimensions, such as web site traffic or sales data. It should be understood that the customer can create a new cube as described in reference to FIG. 4 and is not limited to solely viewing the previously created cubes.

Continuing with flowchart 168, the method proceeds to operation 172 where the cube chosen by the customer is loaded. In one embodiment the invention the cube is loaded to view from an abstraction layer. The abstraction layer is described in more detail in reference to FIG. 6. In another embodiment of the invention, only the data that the customer has requested for viewing is abstracted and provided to the customer's computer for viewing in a cube format. It can be appreciated that viewing the data through an abstraction layer is a much more efficient process since only the data requested is displayed. Accordingly, the view will be presented more quickly over a network connection since only the requested data, and not the entire data structure or cube, is presented. As such, the time to present the requested view will be much less over lines of the same bandwidth and therefore operate much more efficiently.

Next, the loaded cube is viewed by the customer in operation 174. Here, the customer may be presented with options on how to view the cube. For example, the customer may desire to view a portion of the defined dimensions. In addition, the customer may wish to view a portion of the values of the defined dimensions. In one embodiment of the invention, the customer may modify the view of the cube through click and drag functionality of the cube viewer software. Options available to the customer are further described in reference to FIGS. 8A–C. It can be appreciated that the cube can be viewed via a wide area network (WAN), an Internet browser compatible format, an electronic mail file format, etc.

Flowchart 168 continues with operation 176 where the customer can update the time parameters defining the cube view. For example the end date, expiration date and frequency as defined in reference to FIG. 3 may be modified. In one embodiment of the invention, the cube view can be refreshed to include recently processed data. Flowchart 168 terminates with operation 178 where the customer may delete a cube from the system, if the customer desires.

Figure 6:
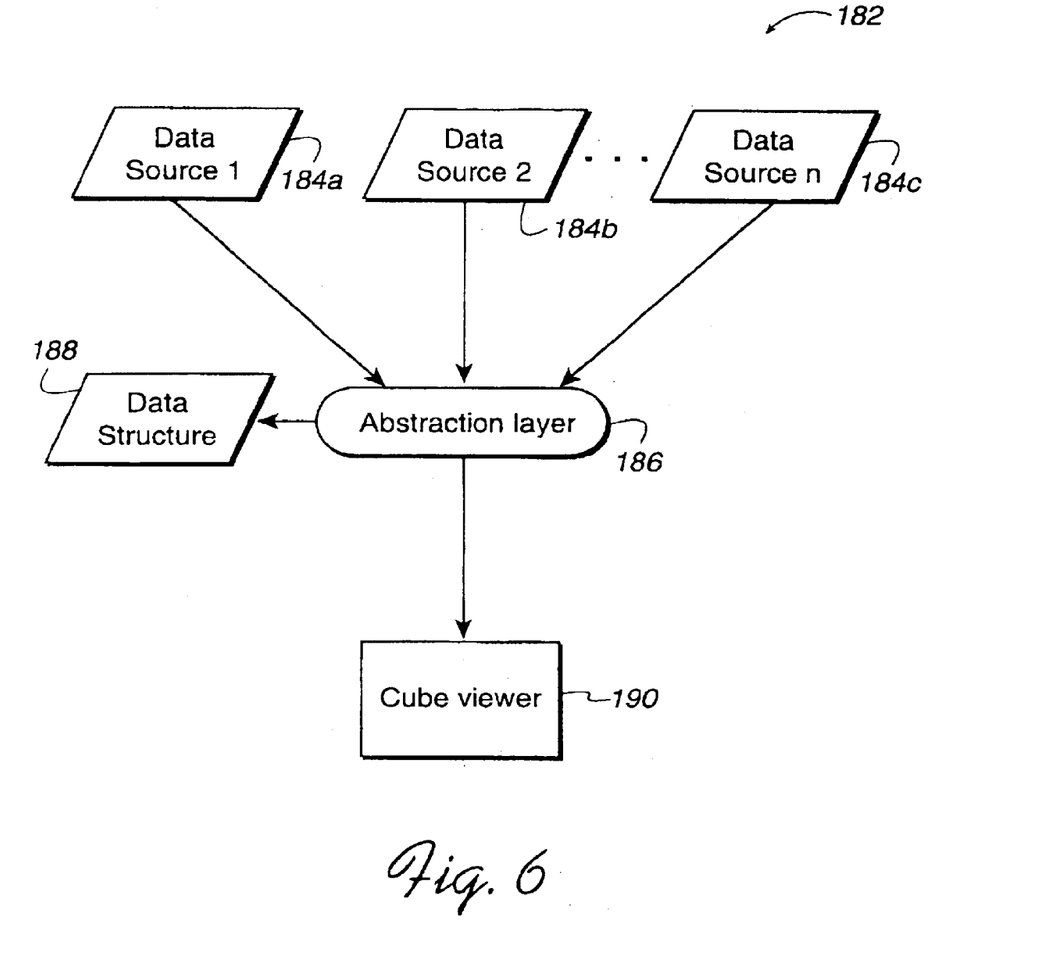
FIG. 6 illustrates a block diagram defining functions performed by the abstraction layer in accordance with one embodiment of the invention.

FIG. 6 illustrates a block diagram 182 defining functions performed by the abstraction layer in accordance with one embodiment of the invention. Block diagram 182 illustrates data source 1 184a, data source 2 184b and data source n 184n. The data sources may contain relevant information to the dimensions defined by the customer. In one embodiment of the invention, the data sources can be defined by any structure. Example structures may include a cube, a hierarchical table structure, a web database, a flat file containing data, a relational data table, etc. It can be appreciated that the information in the relational data table may be two dimensional or multi-dimensional.

Block diagram 182 also illustrates abstraction layer 186 which interfaces the data sources. In one embodiment of the invention, the location of the data sources is supplied when the customer defines the dimensions. The abstraction layer 186 obtains the relevant information for the defined dimensions from the data sources for each dimension and transfers the relevant information to data structure 188. In a preferred embodiment of the invention, the abstraction layer 186 obtains only selected portions of the relevant information for the defined dimensions. In another preferred embodiment of the invention, the selected portions of the relevant information are converted to a uniform format by the abstraction layer 186 and then transferred to data structure 188. For example, the uniform format may be extensible markup language (XML), hyper text markup language (HTML), standard generalized markup language (SGML), etc.

Continuing with block diagram 182, the cube viewer 190 displays the data in data structure 188 as managed by the abstraction layer 186. Exemplary multi-dimensional displays are described in reference to FIGS. 8A–C. As described above the customer may modify the cube view. It can be appreciated that the abstraction layer provides for a more efficient processing method by managing the amount of data supplied to the cube viewer. For example, if the customer desires only to view certain defined dimensions or certain values of defined dimensions, the abstraction layer will supply only the requested data to the cube viewer. Since the cube viewer is not directly interfaced to the entire data structure, the entire data structure is not downloaded locally or viewed entirely on a server over the Internet. Accordingly, the customer's activity with a cube will place reduced processing loads on its local system, while reducing network traffic.

Figure 7:
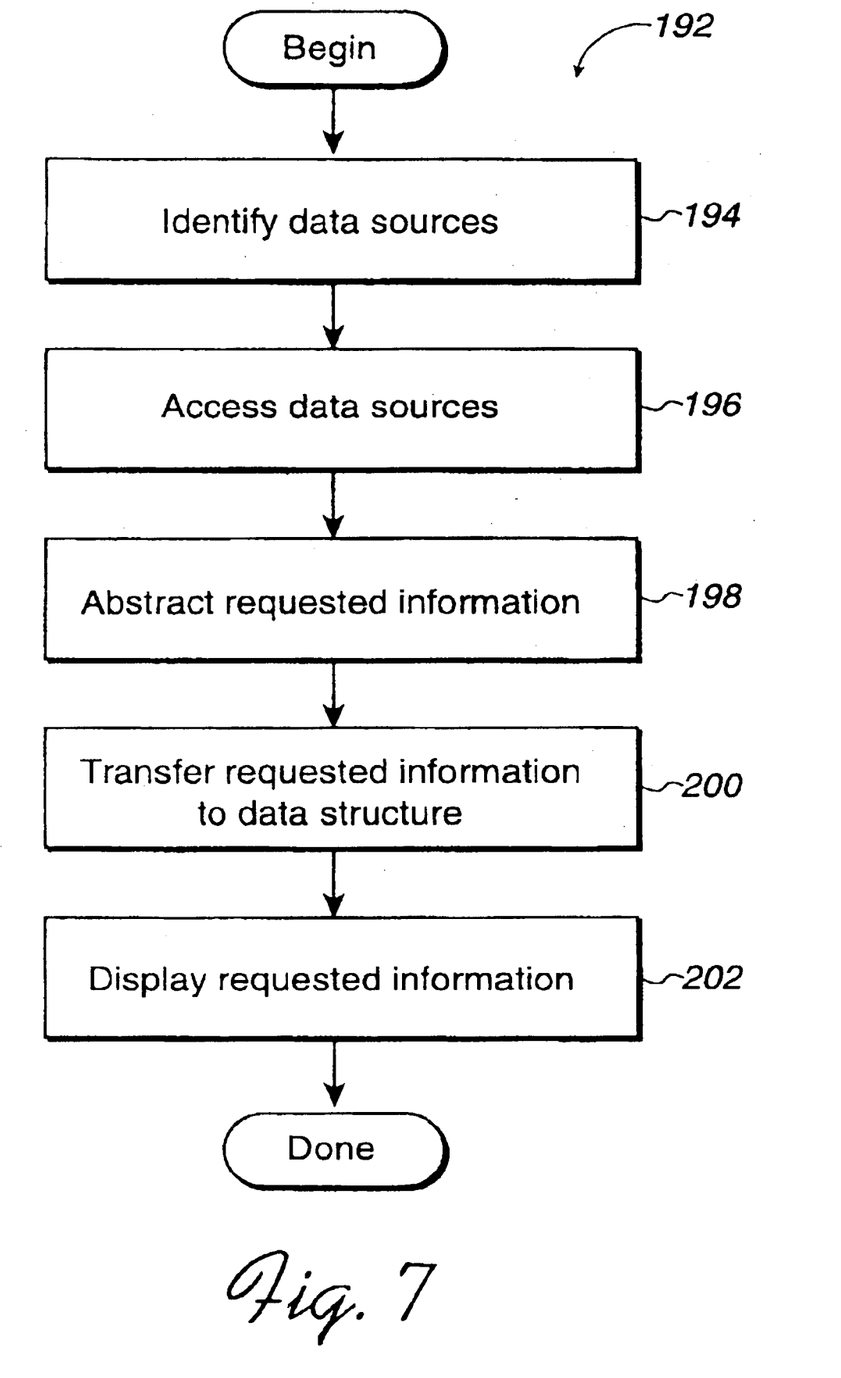
FIG. 7 displays flowchart defining a method for accessing data from differing data sources for display over a network connection.

FIG. 7 displays flowchart 192 defining a method for accessing data from differing data sources for display over a network connection. Flowchart 192 initiates with operation 194 where the data sources are identified. Here, the data sources may be any data sources containing information useful for business analysis purposes. In one embodiment of the invention, the location of the data sources are defined by the customer. In another embodiment of the invention, the data sources may be any one of a cube, a hierarchical table structure, a web database, a flat file containing processed data and a relational data table. It may be appreciated that the data sources can be either two-dimensional or multi-dimensional, thereby allowing the customer to combine data from varying data sources for viewing. For example, sales data from an Enterprise Resource Planning (ERP) system may be combined with a web site's traffic data contained in a hierarchical table structure and presented as a multi-dimensional cube.

Continuing with flowchart 192, the method advances to operation 196 where the identified data sources of operation 194 are accessed. In one embodiment of the invention, the data sources may be accessed through an abstraction layer. In a preferred embodiment, the abstraction layer reads only a selected portion of the relevant information. The method then advances to operation 196 where the requested information is abstracted from the data sources. In one embodiment of the invention, selected portions of the requested information is read by the abstraction layer to identify the relevant portions of the requested data.

Next, the method proceeds to operation 200, where the requested information from each data source is transferred to a data structure. In one embodiment of the invention, the relevant information is transferred to a data structure through an abstraction layer. In a preferred embodiment of the invention, the selected portions of the relevant information are converted to a uniform format by the abstraction layer. It can be appreciated that the format may be defined by any language allowing data to pass over the Internet as described in reference to FIG. 6.

Flow chart 192 terminates with operation 202 where the customer requested information is displayed. Here, the information may be displayed through a viewer, such as an OLAP cube viewer as described in reference to FIG. 5. As previously mentioned above, the presentation may be two-dimensional or multi-dimensional. In one embodiment of the invention, the requested presentation is displayed through an abstraction layer. In a preferred embodiment of the invention, the abstraction layer displays only the selected portions of the relevant information as requested by the customer. It can be appreciated that the abstraction layer allows for a much more efficient viewing process. Since the viewer displaying the requested presentation is not directly connected to the entire data structure, the abstraction layer can manage the amount of data delivered to the viewer so that only the requested data is loaded. Furthermore, it does not matter if the information or data is coming from varying data sources, since the cube viewer is looking at the abstraction layer for the information or data. Therefore, the different formats of the relevant information in the varying data sources is not a limitation because in one embodiment of the invention the abstraction layer converts the different formats to a uniform format.

Figure 8A:
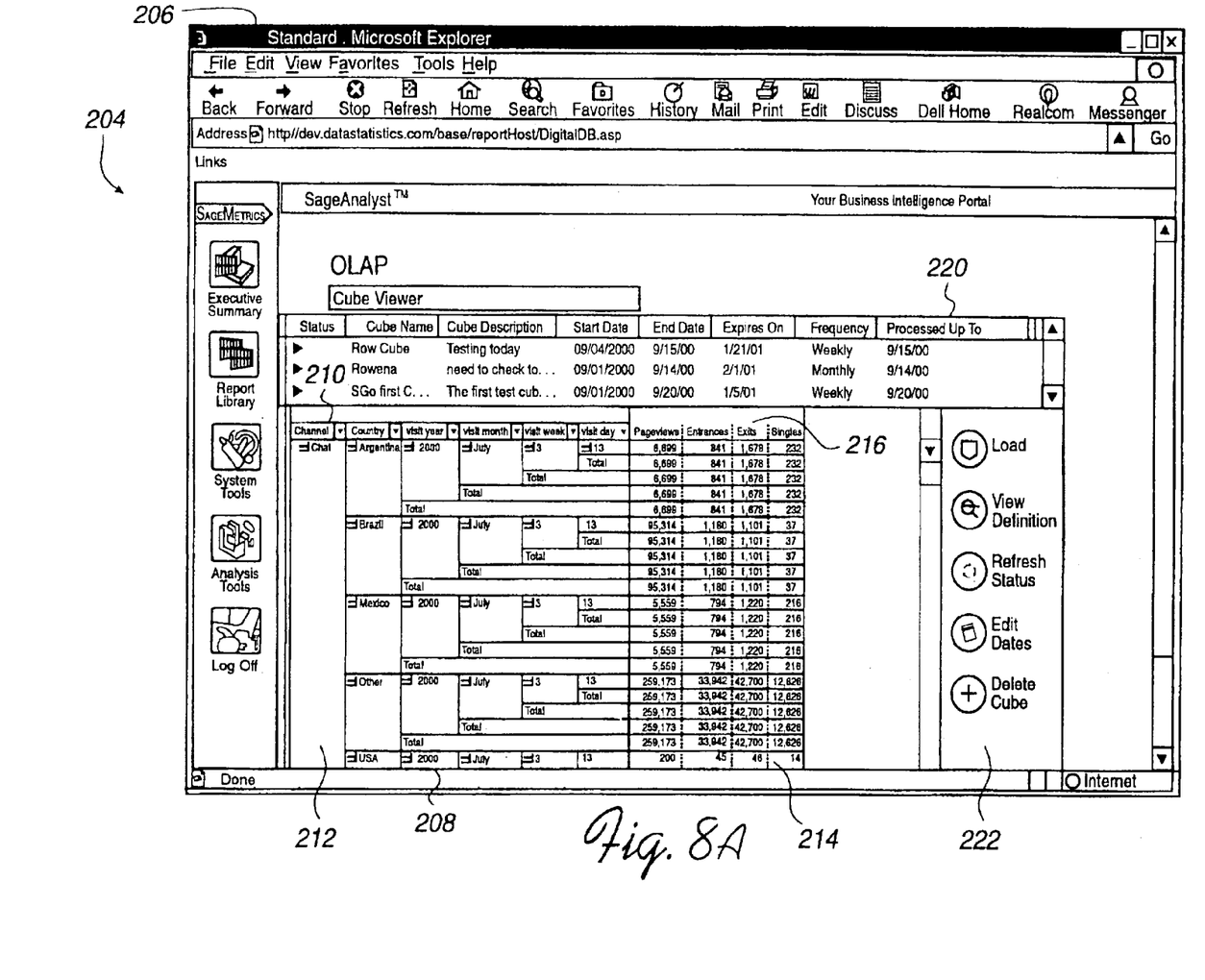
FIG. 8A illustrates an exemplary presentation of an OLAP cube through an OLAP cube viewer in accordance with one embodiment of the invention.

FIG. 8A illustrates a diagram 204 which is an exemplary presentation of an OLAP cube 206 through an OLAP cube viewer in accordance with one embodiment of the invention. Within OLAP cube 206, an interactive region 208 is present. A row of dimensions 210 is displayed. In one embodiment of the invention, a portion of the dimensions may be predefined. For each dimension 210 corresponding values are listed in the columns 212 below each dimension. A results region 214 including a row of measures 216 is displayed in the exemplary presentation. In one embodiment of the invention, the measures may be predefined. It can be appreciated that drag and drop functionality can be included in regions 208 and 214. In one embodiment of the invention, any of the icons representing the dimensions displayed in the row of dimensions 210 can be dragged and dropped to a different position in row 210 to create a different view. In another embodiment of the invention, the presentation may include an available cube section 220 and a modification section 222.

Figures 8B, 8C:
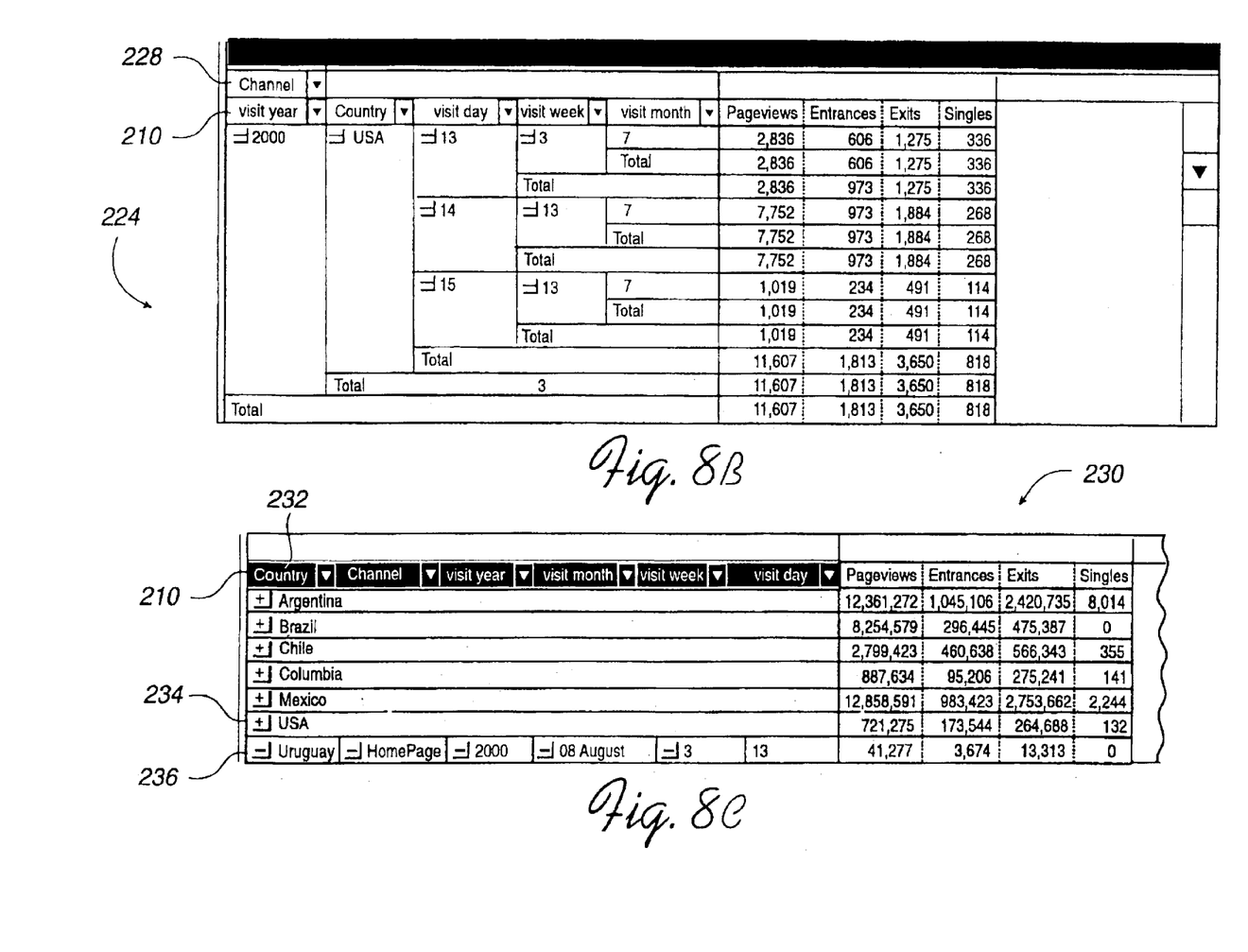
FIG. 8B illustrates an exemplary presentation of an OLAP cube through an OLAP cube viewer in accordance with one embodiment of the invention.
FIG. 8C illustrates an exemplary presentation of an OLAP cube through an OLAP cube viewer in accordance with one embodiment of the invention.

FIG. 8B illustrates an exemplary presentation of an OLAP cube 224 through an OLAP cube viewer in accordance with one embodiment of the invention. Dimension 228 Channel has been dragged and dropped above the row of dimensions 210, thereby eliminating dimension 228 from the presented view. It can be appreciated that any of the dimension in the row of dimensions 210 can be eliminated from the presented view.

FIG. 8C illustrates an exemplary presentation of an OLAP cube 230 through an OLAP cube viewer in accordance with one embodiment of the invention. Here the user may easily modify the dimensions as shown. For example, any of the dimensions in the row of dimensions 210 may be modified to include or eliminate sub-dimensions or values. For example the dimension of "Country 232" has values associated with it as displayed below "Country" 232. In one embodiment of the invention the values can be chosen to be included in the presentation by clicking near the value so that a "+" 234 is displayed. In addition, values can be chosen to be eliminated from the display by clicking near the value so that a "−" 236 is displayed.

The invention described herein is described with reference to a single customer. However, the embodiments of the invention can be performed for any number of customers. For example, the above described system may be a multi-tenant distributed application designed for multiple customers. In particular, a single instance of the data acquisition engine, the loader application and the Continuous Object Progression (COP) application of the present invention can be executed to serve multiple customers or perform multiple tasks for the same customer all at one time.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for accessing selected data for presentation as multi-dimensional cubes over a network connection, comprising:

defining dimensions for generating a cube;

acquiring processed data from a flat file, the processed data containing relevant information for the defined dimensions;

storing the acquired processed data in a hierarchical table structure;

generating a cube from the hierarchical table structure;

accessing the cube through an abstraction layer, the abstraction layer performing the operations of, reading only selected portions of the relevant information for the defined dimensions, converting the selected portions of the relevant information to a uniform format, and displaying selected portions of the relevant information without causing non-selected portions of the relevant information to be read and converted.

2. A method for accessing selected data for presentation as multi-dimensional cubes over a network connection as recited in claim 1, wherein the multi-dimensional cubes are displayed by a cube viewer.

3. A method for accessing selected data for presentation as multi-dimensional cubes over a network connection as recited in claim 2, wherein the displayed multi-dimensional cubes include an interactive region and a results region.

4. A method for accessing selected data for presentation as multi-dimensional cubes over a network connection as recited in claim 3, wherein the interactive region includes user manipulation controls that can be arranged for a particular view of the defined dimensions.

5. A method for accessing selected data for presentation as multi-dimensional cubes over a network connection as recited in claim 4, wherein the user manipulation controls include drag and drop icons that can be arranged for the view.

6. A method for accessing selected data for presentation as multi-dimensional cubes over a network connection as recited in claim 1, wherein the hierarchical table structure defines a virtual tree.

7. A method for accessing selected data for presentation as multi-dimensional cubes over a network connection as recited in claim 1, wherein the processed data containing relevant information is stored in a flat file.

8. A method for accessing selected data for presentation as multi-dimensional cubes over a network connection as recited in claim 1, wherein the uniform format is one of extensible markup language, hyper text markup language and standard generalized markup language.

9. A method for accessing selected data for presentation as multi-dimensional cubes over a network connection as recited in claim 1, wherein defining dimensions for generating a cube further comprises:

creating values for the defined dimensions.

10. A method for accessing selected data for presentation as multi-dimensional cubes over a network connection as recited in claim 1, wherein the hierarchical table structure contains virtual dimensions.

11. A method for accessing selected data for presentation as multi-dimensional cubes over a network connection, comprising:

defining a first dimension and a second dimension for generating a cube;

creating a hierarchical table structure from a flat file for the first dimension, the hierarchical table structure containing relevant information to the first dimension;

generating a cube from the hierarchical table structure;

identifying a relational data table for the second dimension, the relational data table containing relevant information to the second dimension;

accessing the cube and the relational data table through an abstraction layer, the abstraction layer performing the operations of, reading only selected portions of the relevant information for the first and second dimensions, converting the selected portions of the relevant information to a uniform format, and displaying selected portions of the relevant information without causing non-selected portions of the relevant information to be read and converted.

12. A method for accessing selected data for presentation as multi-dimensional cubes over a network connection as recited in claim 11, wherein the displaying selected portions of the relevant information without causing non-selected portions of the relevant information to be read and converted further comprises:

presenting the selected portions as a multi-dimensional cube.

13. A method for accessing selected data for presentation as multi-dimensional cubes over a network connection as recited in claim 12, wherein the presented multi-dimensional cube includes an interactive region and a results region.

14. A method for accessing selected data for presentation as multi-dimensional cubes over a network connection as recited in claim 13, wherein the interactive region includes user manipulation controls that can be arranged for a particular view of the defined dimensions.

15. A method for accessing selected data for presentation as multi-dimensional cubes over a network connection as recited in claim 14, wherein the user manipulation controls include drag and drop icons that can be used to generate the view.

16. A method for accessing selected data for presentation as multi-dimensional cubes over a network connection as recited in claim 11, wherein the uniform format is one of extensible markup language, hyper text markup language and standard generalized markup language.

17. A method for accessing selected data for presentation as multi-dimensional cubes over a network connection as recited in claim 11, wherein the hierarchical table structure contains virtual dimensions.

18. A method for accessing selected data for presentation as multi-dimensional cubes over a network connection as recited in claim 11, wherein the displaying selected portions of the relevant information without causing non-selected portions of the relevant information to be read and converted further comprises:

generating the cube in one of a wide area network (WAN), an Internet browser compatible format and an electronic mail file.

* * * * *